(12) United States Patent
Herz et al.

(10) Patent No.: US 8,656,418 B2
(45) Date of Patent: Feb. 18, 2014

(54) PROVIDING A PROXY VIEW FOR AN APPLICATION IN A WINDOW MANAGER

(75) Inventors: Scott Herz, San Jose, CA (US); John Harper, San Francisco, CA (US); Christopher Marcelling, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/616,713

(22) Filed: Sep. 14, 2012

(65) Prior Publication Data
US 2013/0067402 A1 Mar. 14, 2013

Related U.S. Application Data

(63) Continuation of application No. 12/405,202, filed on Mar. 16, 2009, now Pat. No. 8,291,440.

(51) Int. Cl.
*G06F 13/00* (2006.01)
(52) U.S. Cl.
USPC .......................................................... 719/329
(58) Field of Classification Search
USPC .......................................................... 719/329
See application file for complete search history.

(56) References Cited

U.S. PATENT DOCUMENTS

2009/0210482 A1* 8/2009 Wynn et al. .................... 709/203
2009/0313569 A1* 12/2009 Gibson et al. .................. 715/771

* cited by examiner

*Primary Examiner* — Andy Ho
(74) *Attorney, Agent, or Firm* — Blakely, Sokoloff, Taylor & Zafman LLP

(57) ABSTRACT

A window manager process hosts proxy window objects created by an application in a window manager display structure. A process in a device creates a local proxy view object within a window manager display structure for the window manager process. The process registers an identifier for a remote proxy window object which corresponds to an application display structure. The application controls processing of data used by the application. The process assigns the identifier for the remote proxy window object to the local proxy view object in the window manager display structure to create a composite display structure and renders the composite display structure to display an image on a display device. The image corresponds to the objects of the application display structure represented by the remote proxy window object. The window manager process controls rendering of the composite display structure.

39 Claims, 8 Drawing Sheets

PROVIDING A PROXY VIEW FOR AN APPLICATION IN A WINDOW MANAGER

This application is a continuation of U.S. application Ser. No. 12/405,202, filed on Mar. 16, 2009, now U.S. Pat. No. 8,291,440, issued on Oct. 16, 2012.

TECHNICAL FIELD

This invention relates to the field of computing devices and, in particular, to displaying an image on a computing device.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright© 2009, Apple Inc., All Rights Reserved.

BACKGROUND

Electronic devices, such as computer systems, wireless cellular telephones, mobile computing devices or other data processing systems often include a visual display device. Many modern computer systems implement a graphical user interface (GUI) on the display device. The GUI may include multiple windows, or frames of visual data, each displaying separate content, and one or more views within each window. Every object displayed on the screen (e.g., icon, image, status bar, etc.) may be in a separate view. The display device may display a single window or, in certain situations, may display multiple windows at the same time.

The determination, of which windows and views are displayed, along with how, when and where they are displayed, may be controlled by a single process resident on the computing device, known as a window manager process. The window manager process may include windows and views related to the system and may provide for displaying windows and views controlled by other applications running on the computing device. In the case of an application, typically, the window manager process requests that display data from the application be sent to the window manager process where it is copied directly into the window manager process space. FIG. 1 is a block diagram illustrating the process space of a prior art computing device. The process space is divided into a window manager process space and an application process space. The application process space includes an application display structure 150 made up of an application window 152 and multiple application views 154. In order to display an image based on the application display structure 150, the application display structure is copied into a rendering structure 130 in the window manager process space. From there, an image is rendered based on the rendering structure 130 and including application display structure 150.

It is preferable to avoid applications having direct access to the window manager process space. There is a significant security risk in allowing third party applications to access the fundamental window manager process. Applications may be developed by a party other than the manufacturer of the computing device and window manager process, and it may be desirable to prohibit these applications from having direct access. Additionally, a failure of the application process while operating in the window manager process space could result in a crash of the entire computing device. Furthermore, as an increasing number of applications take up part of the window manager process space, the window manager process gains an increasingly larger memory footprint. At a certain point, the window manager process may become so large, that it will hinder operation of the computing device.

SUMMARY OF THE INVENTION

In some embodiments, a window manager process hosts proxy window objects created by an application in a window manager display structure. A process in a device creates a local proxy view object within a window manager display structure for the window manager process. The process registers an identifier for a remote proxy window object which corresponds to an application display structure. The application controls processing of data used by the application. The process assigns the identifier for the remote proxy window object to the local proxy view object in the window manager display structure to create a composite display structure and renders the composite display structure to display an image on a display device. The image corresponds to the objects of the application display structure represented by the remote proxy window object. The window manager process controls rendering of the composite display structure.

BRIEF DESCRIPTION OF THE DRAWINGS

The present invention is illustrated by way of example, and not by way of limitation, in the figures of the accompanying drawings.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
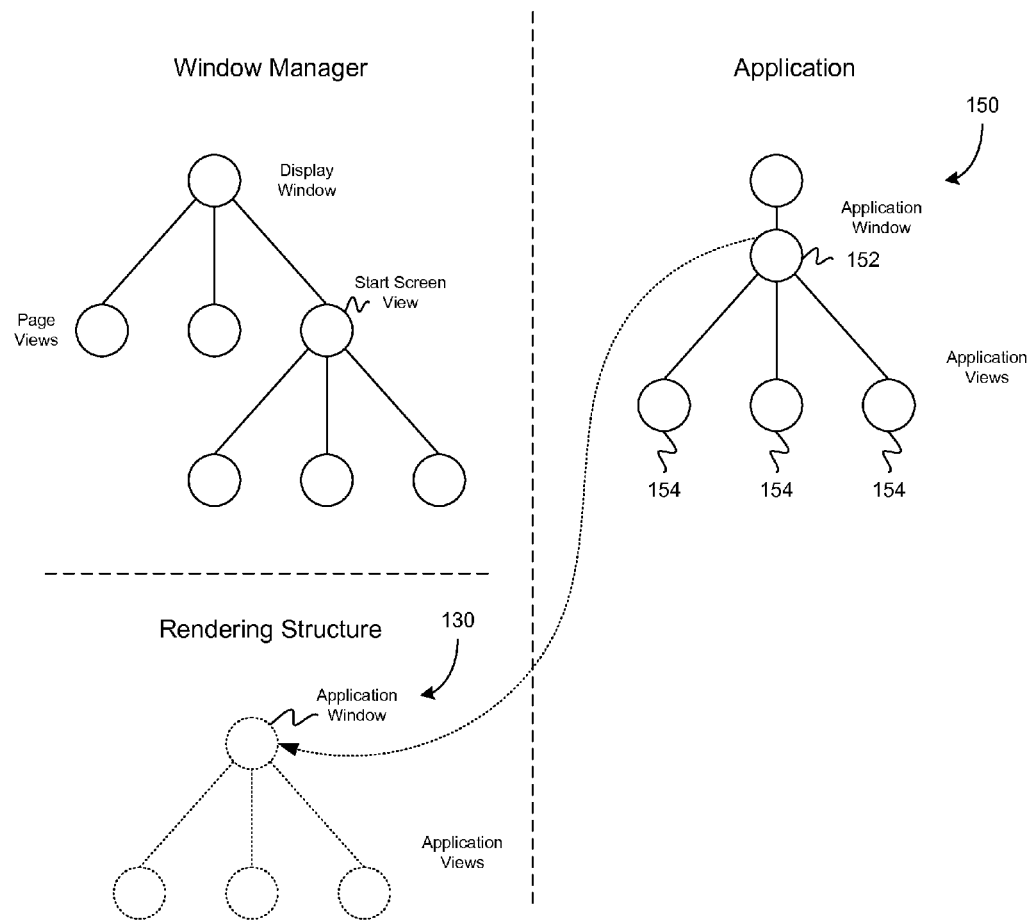
FIG. 1 is a block diagram illustrating the process space of a prior computing device.
Figure 2A:
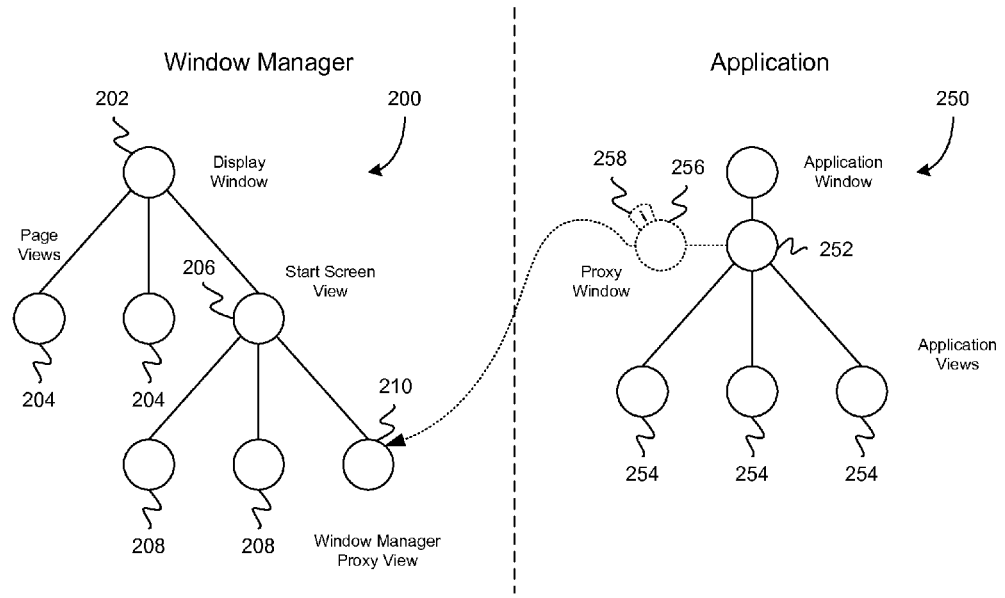
FIG. 2A is a block diagram illustrating the process space of a computing device according to one embodiment.
Figure 2B:
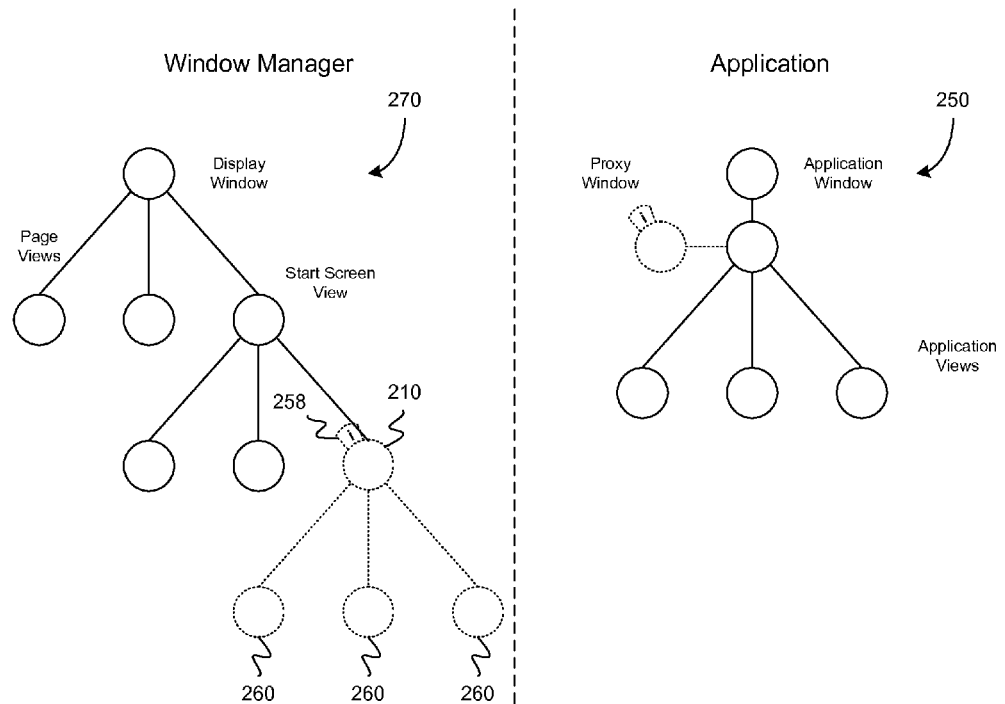
FIG. 2B is a block diagram illustrating the process space of a computing device according to one embodiment.
Figure 2C:
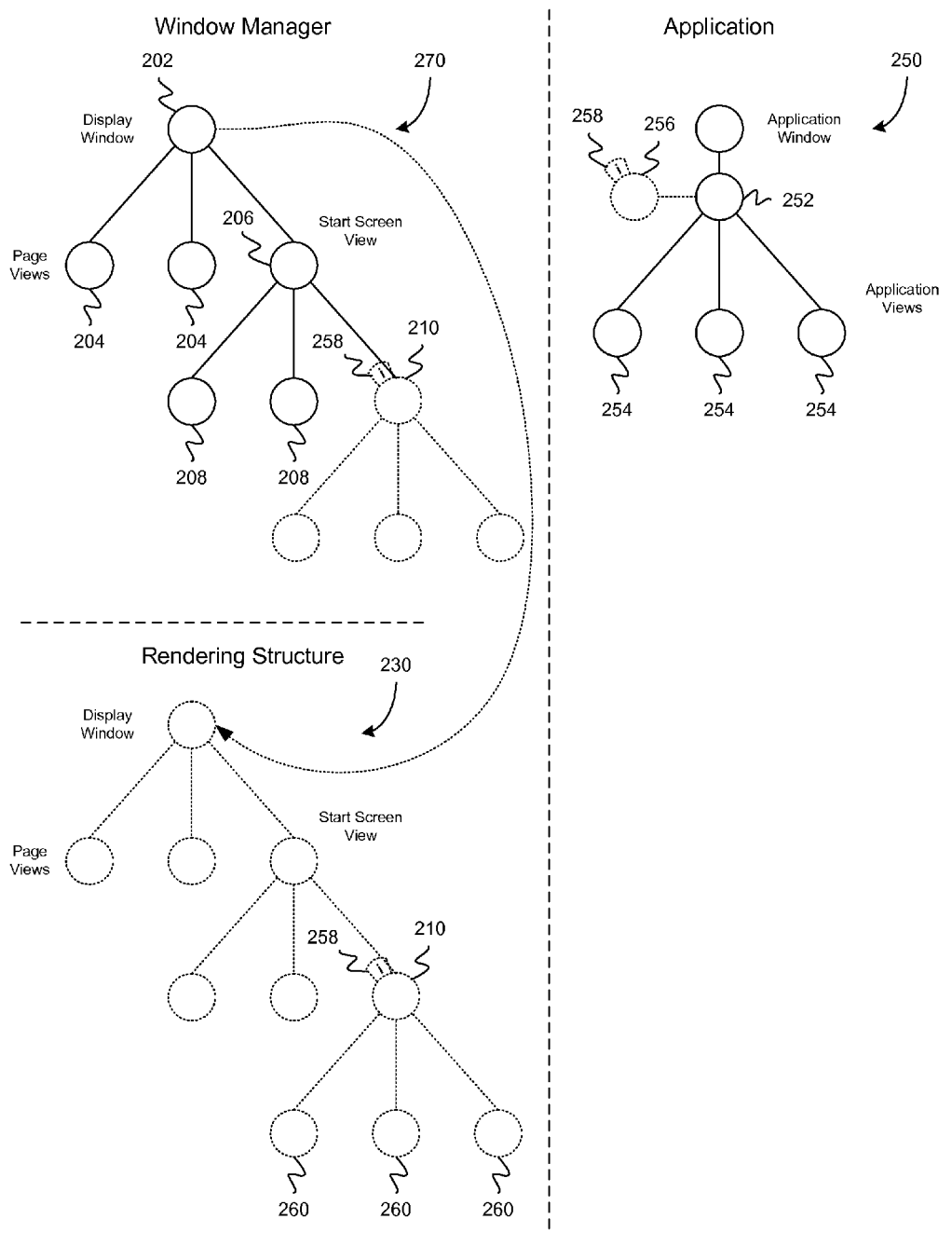
FIG. 2C is a block diagram illustrating the process space of a computing device according to one embodiment.

Beginning with an overview of the operation of the invention, FIGS. 2A-2C illustrate one embodiment of a computing device that generates a composite data structure in which a portion of a display structure for an application is mapped onto the display structure for a window manager process. Each of the display structures is arranged in a hierarchy and each level of the hierarchy contains objects representing windows or views that are rendered to form a display image. The top level, or "root," of each display structure is a window object, with lower levels containing one or more view objects linked to an object in the next higher level. The window manager process controls the mapped portion of the application display structure, while the application retains control over processing of all data used by the application. Embodiments allow for the ability to incorporate application controlled views within a system view, such as a start screen view of the computing device. Additionally, global animation behaviors, controlled by the window manager process, may be incorporated within application controlled views, and views from one application may be included in views from a second application.

FIG. 2A illustrates the process space of a computing device according to one embodiment. In this embodiment, the process space of the computing device is divided into two sections: a window manager process space and a first process space. In one embodiment, the first process space may be an application process space. In alternative embodiments, the process space may be divided into another number of sections. In one embodiment, the window manager display structure 200 includes display window object 202. One logical level below window object 202 in the display structure are a number of page view objects 204. There may be any number of page view objects on this level. One of the page view objects is a start screen view object 206 that corresponds to a start screen displayed by the computing device. The start screen may be displayed when no other applications or processes are running on the computing device. One logical level below start screen view object 206 in the display structure hierarchy are view objects 208. View objects 208 may include global animation behaviors that are displayed on the device, such as for example, status bars to indicate the time, date, strength of wireless signal, etc. These global animations may be imposed on application controlled views, such that the application views are displayed along with the global animations on the device. One of the view objects in the window manager display structure 200 is window manager proxy view object 210. Window manager proxy view object 210 is an object to which a proxy window object from the display structure of an application may be mapped. When a proxy window object is mapped to proxy view object 210, a portion of the application display structure is logically linked to the display structure of the window manager process because the mapped portion of the application display structure is controlled by the window manager process. Thus, the application does not have direct access to the window manager process space and the window manager process resources are not depleted. The application maintains control of content displayed in the proxy window object and controls processing of data used by the application, while the window manager controls rendering of an image from the window object. Thus, when the application controlled proxy window object is mapped to the window manager display structure, the corresponding views are included in a system view such as the start screen, when rendered. In alternative embodiments, the window manager proxy view object 210 is located at another location in the hierarchical display structure 200 of the window manager process. Furthermore, there may be a plurality of proxy view objects located throughout the display structure.

The application process space also has a display structure 250 including application window object 252 and application view objects 254. In alternative embodiments, there are a different number of application window objects and view objects in application display structure 250. In one embodiment, a proxy window object 256 is created in application display structure 250. Proxy window object 256 is a copy of application window object 252. Proxy window object 256 includes one or more sub-views logically linked to proxy window object 256 in a hierarchy.

Proxy window object 256 is assigned an identifier 258 by the application. In one embodiment, the identifier 258 is a universal unique identifier (UUID); however in alternative embodiments, another identifier type may be used. The identifier 258 is used by the system in order to identify which proxy window object is mapped to the proxy view object of the window manager display structure. The identifier 258 of proxy window object 256 is sent from the application to the window manager process using a remote procedure call (RPC). In alternative embodiments, other technologies may be used to transmit the identifier. The window manager process assigns the received identifier 258 to the window manager proxy view object 210. Once assigned to proxy view object 210, identifier 258 provides a logical link to the proxy window object 256.

FIG. 2B illustrates the display structure of the window manager process when proxy window object 256 has been mapped to proxy view object 210. The result is a composite display structure 270, including the window manager process display structure 200 logically linked to a portion of the application display structure 250.

FIG. 2C illustrates the composite display structure 270 and a rendering structure 230 in the process space of a computing device according to one embodiment. Composite display structure 270 includes the objects of window manager display structure 200 and the mapped portions of application display structure 250. In this embodiment, identifier 258 is assigned to proxy view object 210 providing a logical link to application proxy window object 256.

It will be apparent to a practitioner in the art that the display structures described with reference to FIGS. 2A, 2B and 2C may be implemented in various alternative ways. For example, for the purposes of clarity, this description refers to objects, logical links, hierarchies and the like. Nevertheless, a view object may alternatively be implemented as any equivalent data structure; similarly, logical links and hierarchical structures may be implemented using pointers, references, array based indirection, handles, and the like as is known in the art.

When rendering an image, composite display structure 270 is copied into the window manager rendering structure 230. In this embodiment, display window object 202 and all associated view objects 204-210 are copied into rendering structure 230. In place of proxy view object 210, the process renders an image from proxy window object 256. Proxy window object 256 may include one or more view objects 260 logically linked to the proxy window object 256 in a hierarchy. The resulting rendered image includes features from the window manager process display structure 200 as well as from application display structure 250.

Figure 3:
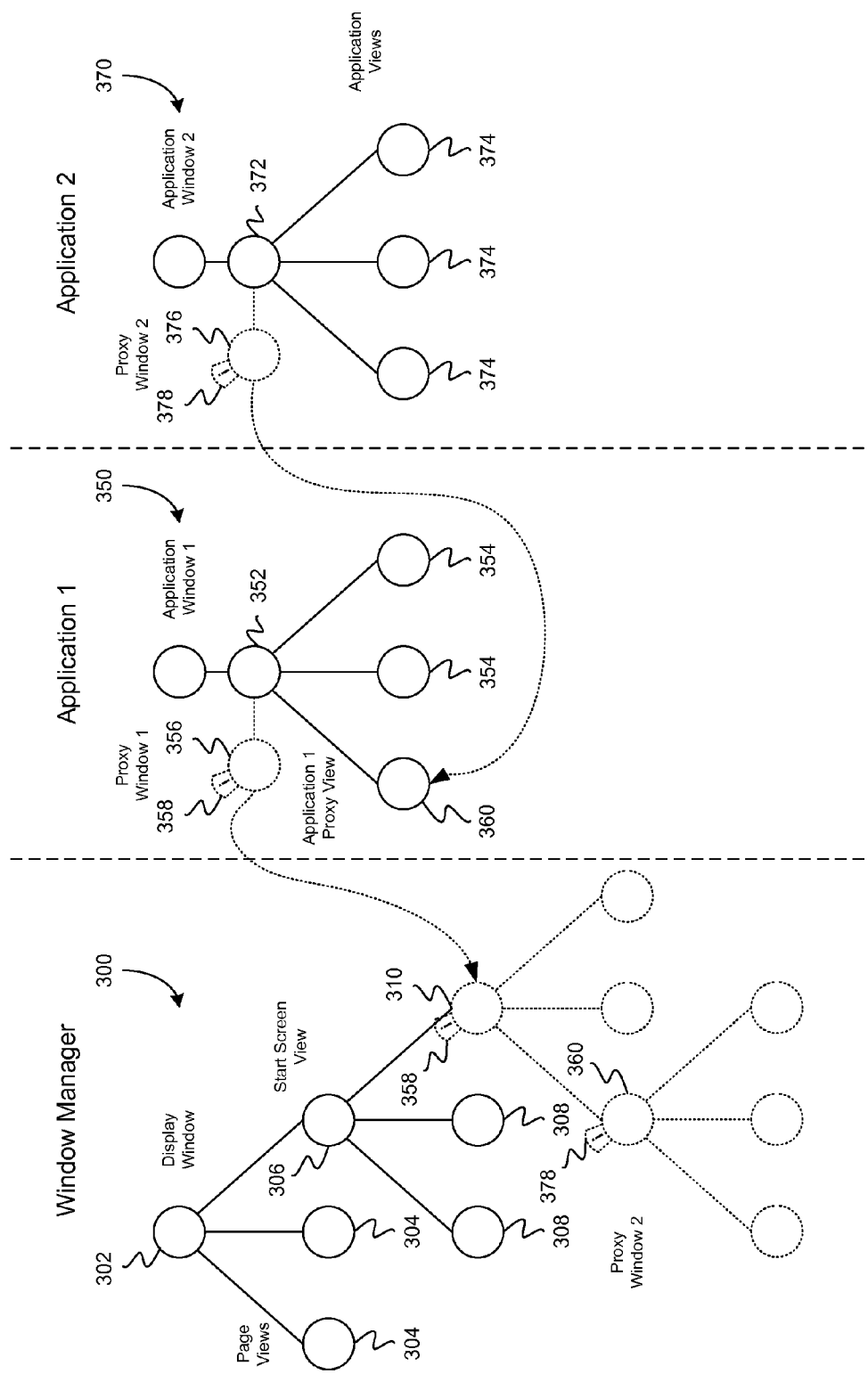
FIG. 3 is a block diagram illustrating the process space of a computing device according to an alternative embodiment.

FIG. 3 illustrates the process space of a computing device according to an alternative embodiment. In this embodiment, the process space of the computing device is divided into three sections: a window manager process space, a first application process space and a second application process space. In alternative embodiments, the process space is divided into another number of sections. Each process space includes a display structure made up of objects representing windows and views that may be rendered to form a display image, as described above with respect to FIGS. 2A-2C.

In the embodiment, illustrated in FIG. 3, the window manager display structure 300 includes display window object 302. A number of page view objects 304 can be found one logical level below window object 302 in the display structure 300. There may be any number of page view objects in a level. One of the page view objects is a start screen view object 306. View objects 308 are located one logical level below start screen view object 306 in the display structure 300. One of the view objects is a window manager proxy view object 310. In alternative embodiments, the window manager proxy view object 310 is located at another location in the hierarchical display structure 300 of the window manager process. Furthermore, there may be a plurality of proxy view objects located throughout the display structure.

The first application process space has a display structure 350 including application window object 352 and application view objects 354. In one embodiment a proxy window object 356 is created in application display structure 350. Proxy window object 356 is a copy of application window object 352. Proxy window object 356 includes one or more sub-views logically linked to proxy window object 356 in a hierarchy and is assigned an identifier 358. One of the view objects in the first application display structure 350 is a proxy view object 360. Proxy view object 360 may be similar to the proxy view object of the window manager display structure, discussed above.

The second application process space has a display structure 370 including application window object 372 and application view objects 374. In one embodiment, a proxy window object 376 is created in application display structure 370. Proxy window object 376 is a copy of application window object 372. Proxy window object 376 may include one or more sub-views logically linked to proxy window object 376 in a hierarchy.

Proxy window object 376 is assigned an identifier 378 by the second application. The identifier 378 is used by the first application in order to identify which proxy window object is mapped to a proxy view object. In this embodiment, the identifier 378 of proxy window object 376 is sent from the second application process to the first application process using a remote procedure call (RPC).

The first application assigns the received identifier 378 to the proxy view object 360. Once assigned to proxy view object 360, identifier 378 provides a logical link to proxy window object 376. Thus, a portion of the second application display structure 370 is mapped into the first application display structure 350 to create a combined display structure. Proxy view object 360 may, in turn, be a part of the structure logically under proxy window object 356. Proxy window object 356 is assigned an identifier 358 by the first application. The identifier 358 is used by the window manager process in order to identify which proxy window object is mapped to a proxy view object. In this embodiment, the identifier 358 of proxy window object 356 is sent from the first application process space to the window manager process space using a remote procedure call.

The window manager process assigns the received identifier 358 to the window manager proxy view object. Once assigned to a proxy view object, identifier 358 provides a logical link to the proxy window object 356. The display structure 356 of the window manager process logically includes proxy window object 356, which has been mapped to a proxy view object. The result is a composite display structure including the window manager process display structure 300 linked to a portion of the first application display structure 350, which in turn, links to a portion of the second application display structure 370. When the window manager process renders an image based on the composite display structure, upon reaching the proxy view object, the window manager process renders an image based on the combined display structure contained in proxy window object 356 identified by identifier 358. Thus, the rendered image corresponds to proxy window object 356 which includes a number of view objects logically linked to proxy window object 356 in a hierarchy, including proxy view object 360 which is logically linked to proxy window object 376 of the second application display structure.

Figure 4:
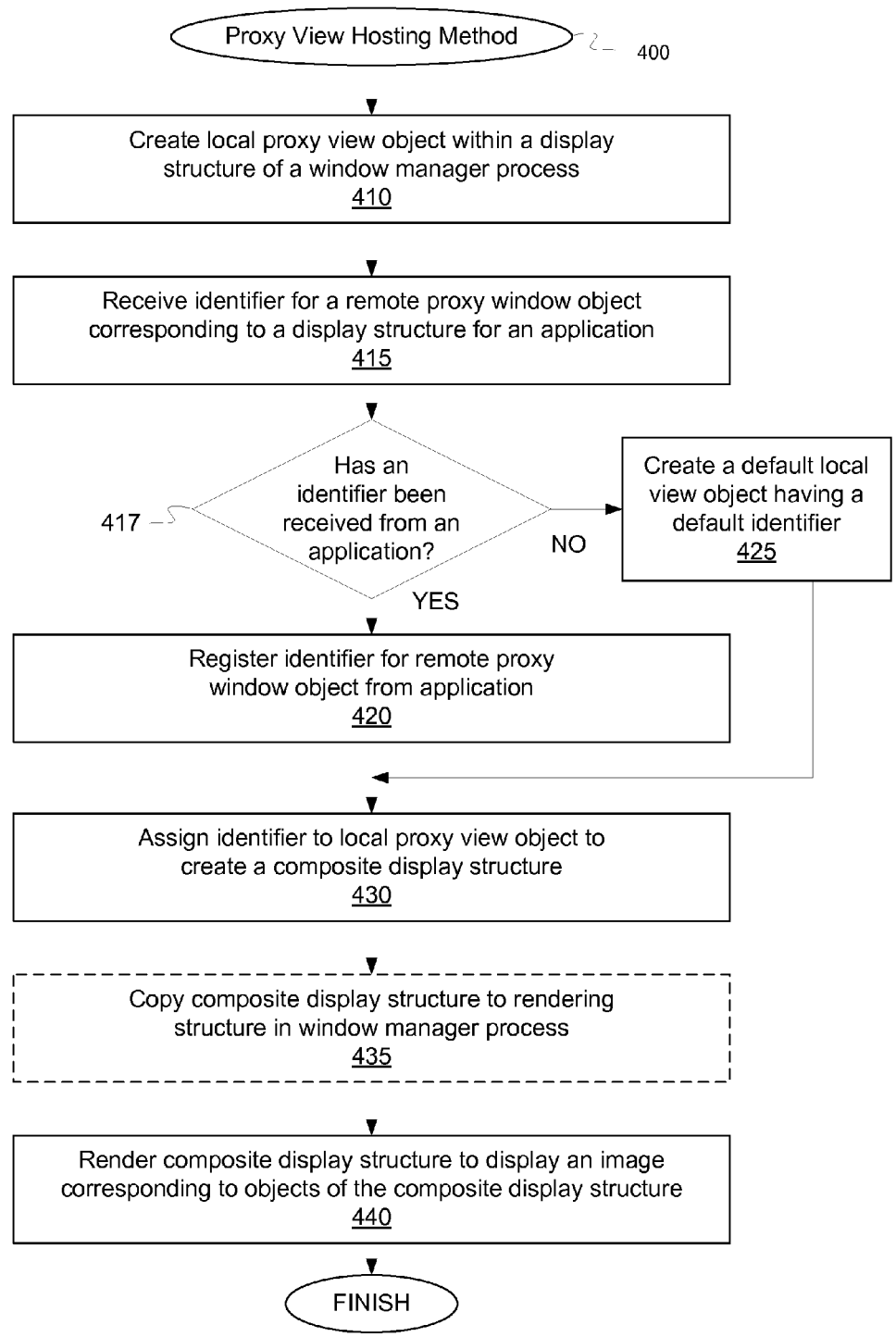
FIG. 4 is a flow chart illustrating a proxy view hosting method according to one embodiment.

FIG. 4 illustrates a proxy view hosting method according to one embodiment. The method 400 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to enable hosting of a proxy view object in the display structure of a window manager process, as further described below in conjunction with FIGS. 5 and 6. In one embodiment, method 400 is performed by the window manager process of FIGS. 2A-2C.

Referring to FIG. 4, at block 410, method 400 creates a local proxy view object within a display structure for a window manager process, such as display structure 200 shown in FIG. 2A. At block 415, method 400 receives an identifier for a remote proxy window object which corresponds to a display structure for an application, such as display structure 250 shown in FIGS. 2A-2C, from the application. At block 417, method 400 determines whether an identifier has been received from an application. If at block 417, method 400 determines that an identifier has been received, method 400 proceeds to block 420. At block 420, method 400 registers the received identifier. If at block 417, method 400 determines that an identifier has not been received, method 400 proceeds to block 425. At block 425, method 400 creates a default local view object having a default identifier. After either block 420 or 425, method 400 proceeds to block 430.

At block 430, method 400 assigns the identifier for either the remote proxy window object or the default identifier to the local proxy view object in the first display structure to create a composite display structure and logically links the local proxy view object is to the remote proxy window object of the application display structure. Optionally, at block 435, method 400 copies the composite display structure to a rendering structure, such as rendering structure 230 shown in FIG. 2C. At block 440, method 400 renders the composite display structure to display an image on a display device. After the image has been rendered process 400 ends.

Figure 5A:
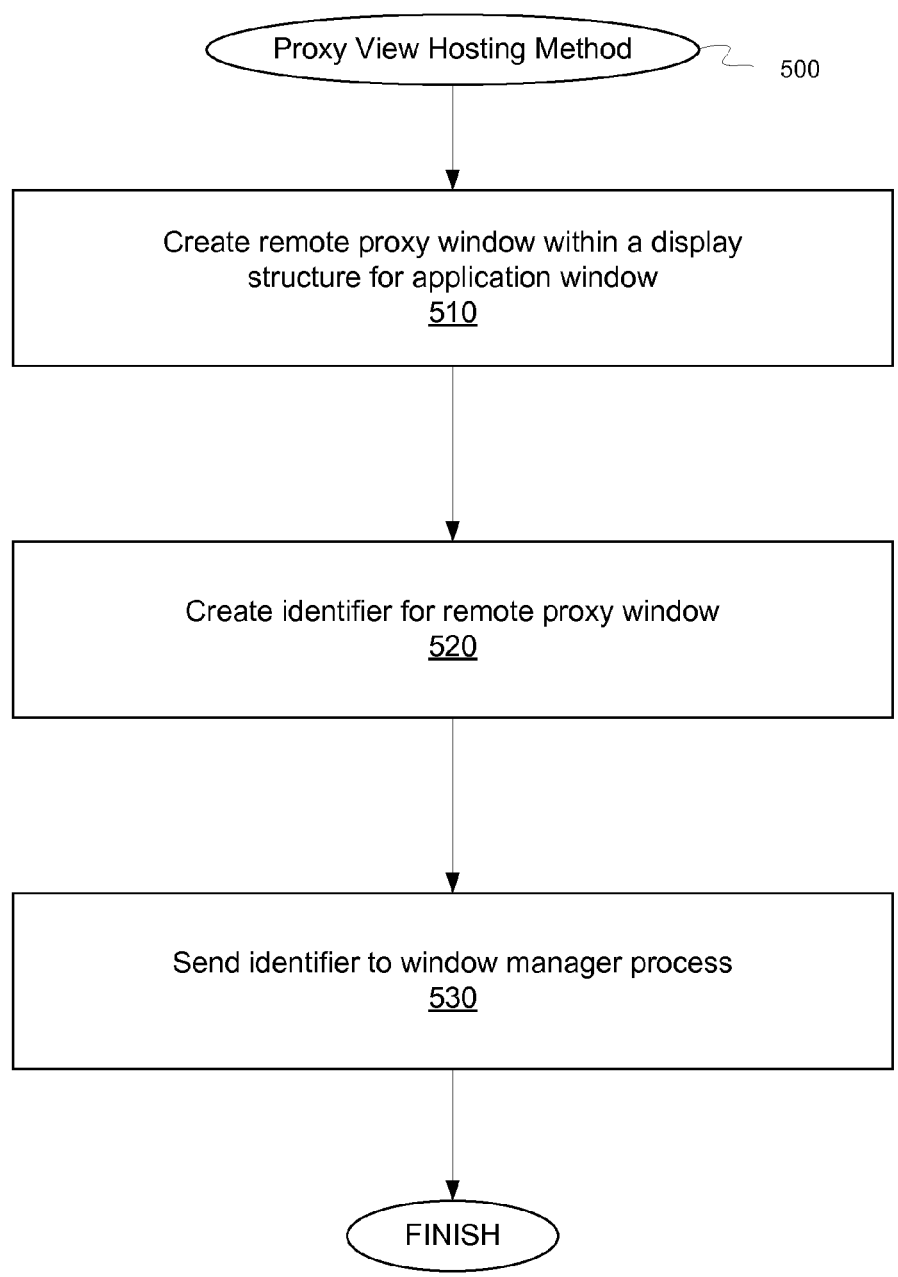
FIG. 5A is a flow chart illustrating a proxy view hosting method according to one embodiment.

FIG. 5A illustrates a proxy view hosting method according to one embodiment. The method 500 may be performed by processing logic as described above with respect to FIG. 4. In one embodiment, method 500 is performed by the application process of FIGS. 2A-2C.

Referring to FIG. 5A, at block 510, method 500 creates a remote proxy window object within a display structure for an application, such as application display structure 250 shown in FIGS. 2A-2C. At block 520, method 500 creates an identifier for the remote proxy window object.

At block 530, method 500 sends the identifier for the remote proxy window object to a local proxy view object in the display structure of a window manager process, such as the window manager process shown in FIGS. 2A-2C. After sending the identifier to the window manager process, process 500 ends.

Figure 5B:
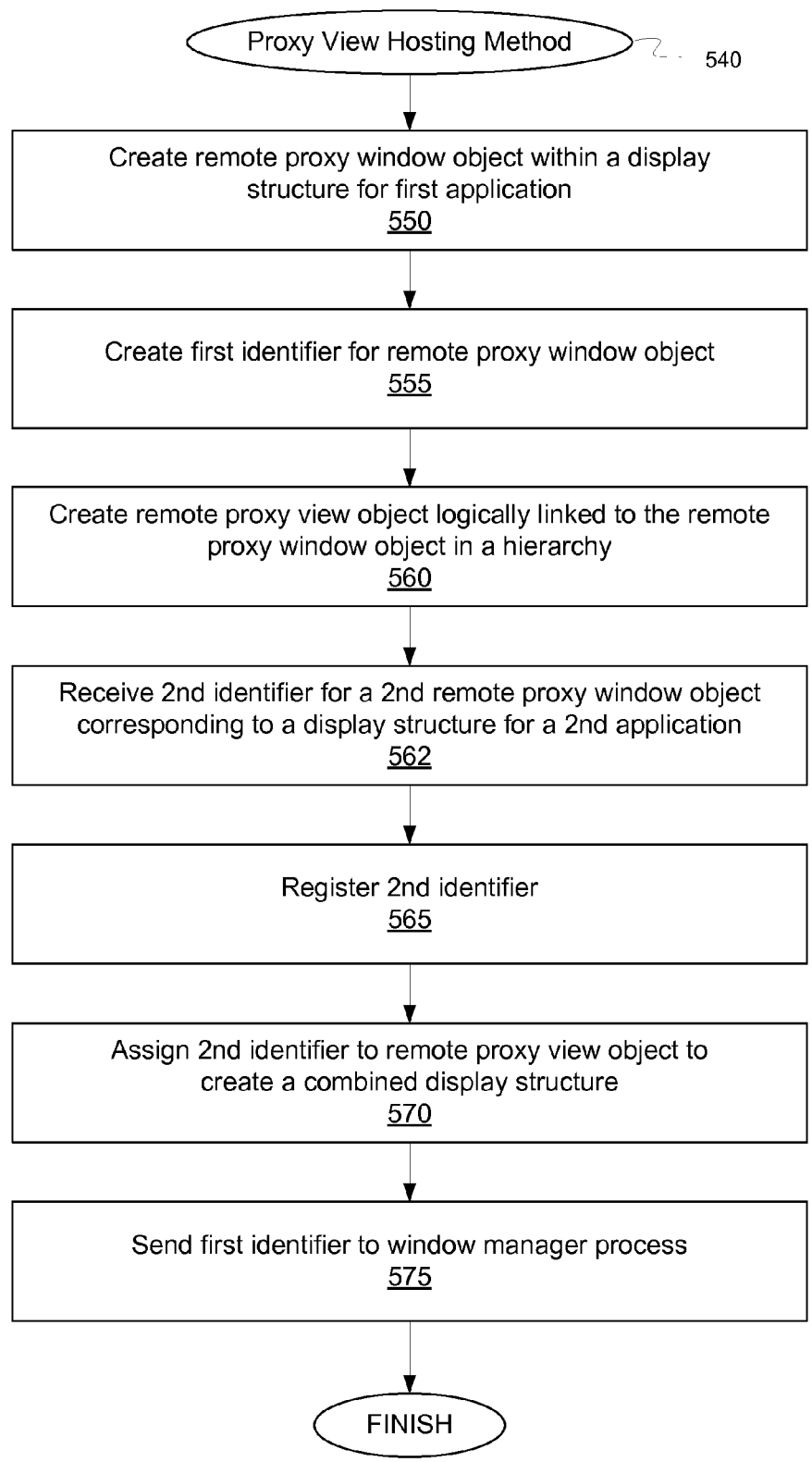
FIG. 5B is a flow chart illustrating a proxy view hosting method according to one embodiment.

FIG. 5B illustrates a proxy view hosting method according to one embodiment. The method 540 may be performed by processing logic as described above with respect to FIG. 5A. The processing logic is configured to enable hosting of nested proxy view objects in the display structure of a window manager process. In one embodiment, method 540 is performed by the first application of FIG. 3.

Referring to FIG. 5B, at block 550, method 540 creates a first remote proxy window object within a display structure for a first application, such as the first application shown in FIG. 3. At block 555, method 540 creates a first identifier for the remote proxy window object. At block 560, method 540 creates a remote proxy view object, such as proxy view object 360 shown in FIG. 3.

At block 562, method 540 receives a second identifier for a second remote proxy window object which corresponds to a display structure for a second application, such as the second application of FIG. 3, from the second application. At block 565, method 540 registers the second identifier. At block 570, method 540 assigns the second identifier for the second remote proxy window object to the remote proxy view object in the display structure of the first application to create a combined display structure. When the second identifier is assigned to the remote proxy view object, the remote proxy window object of the second application is mapped to the remote proxy view object of the first application.

At block 575, method 540 sends the first identifier for the remote proxy window object of the first application to a local proxy view object in the display structure of a window manager process. After sending the identifier to the window manager process, process 540 ends. Thus, when the first identifier is assigned to the local proxy view object, the remote proxy window object of the first allocation is mapped to the local proxy view object of the window manager process. The window manager process renders an image based on objects from the display structures of both the first and second applications.

Figure 6:
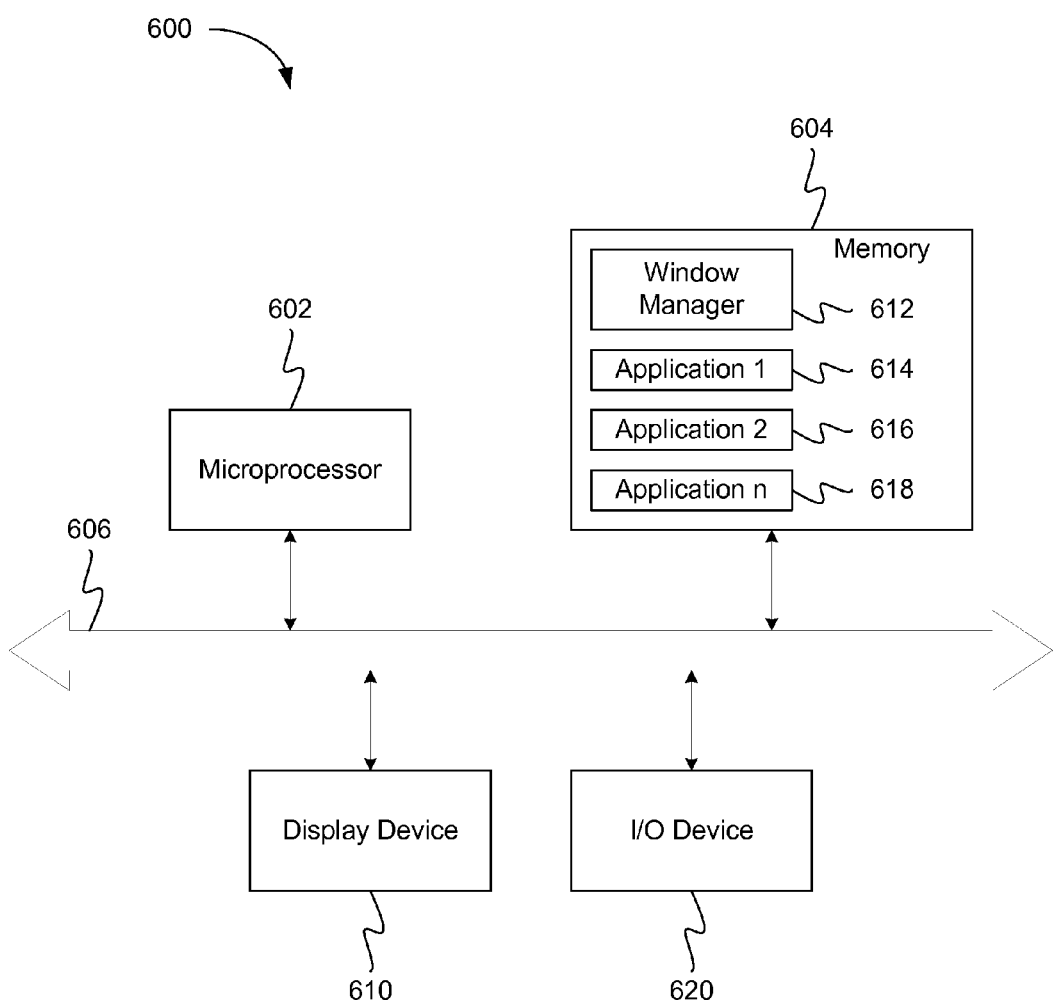
FIG. 6 is a block diagram illustrating a data processing system according to one embodiment.

FIG. 6 illustrates a data processing system according to one embodiment. The system 600 may include a processor, such as processor 602, and a memory 604, which are coupled to each other through a bus 606. The system 600 may also optionally include a display device 610 which is coupled to the other components through the bus 606. One or more input/output (I/O) devices 620 are also connected to bus 606. The bus 606 may include one or more buses connected to each other through various bridges, controllers, and/or adapters as is well known in the art. The I/O devices 620 may include a keypad or keyboard or a cursor control device or a gesture-sensitive device such as a touch or gesture input panel. Memory 604 may include window manager process 612, and applications 614, 616 and 618. In at least certain implementations of the system 600, the processor 602 may receive data from one or more of the applications and may perform the processing of that data in the manner described herein.

In at least certain embodiments, processor 602 is configured to cause images created from data in window manager process 612 and applications 614, 616, 618 to be displayed on display device 610. View objects from at least one of applications 614, 616 and 618 may be included in the display structure of window manager process 612 through a proxy view object. When the display structure is rendered by processor 602, the view objects from the application will be included in the image that is displayed on display device 610.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of the present invention include various operations, which are described above. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing device(s).

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the above descriptions, embodiments have been described in terms of objects in an object-oriented environment. It should be understood, that the invention is not limited to embodiments in object-oriented environments and that alternative embodiments may be implemented in other programming environments having characteristics similar to object-oriented concepts.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method, comprising:
creating, by a display manager executing on a processor in a device, a local proxy view object within a display manager structure in a display manager space;
registering, by the display manager, an identifier for a remote proxy object within a first application display structure for a first application executing in a first application space, wherein the first application display structure further comprises a plurality of application view objects representing views for the first application;
assigning, by the display manager, the identifier for the remote proxy object to the local proxy view object to create a composite display structure in the display manager space; and
rendering, by the display manager, the composite display structure to display an image corresponding to the views for the first application.

2. The method of claim 1, wherein the display manager structure further comprises a local window object and a plurality of local view objects logically linked to the local window object in a hierarchy, wherein the local proxy view object comprises one of the plurality of local view objects.

3. The method of claim 1, further comprising:
determining if an identifier has been received from the first application; and
if an identifier has not been received from the first application, assigning a default identifier to the local proxy view object.

4. The method of claim 1, wherein registering an identifier comprises receiving the identifier from the first application.

5. The method of claim 1, wherein the first application display structure further comprises an application window object logically linked to the plurality of application view objects in a hierarchy, wherein the remote proxy object comprises a copy of the application window object.

6. The method of claim 1, wherein assigning the identifier comprises mapping the remote proxy object to the local proxy view object.

7. The method of claim 2, wherein rendering the composite display structure further displays views corresponding to the local view objects.

8. The method of claim 1, wherein the first application display structure further comprises a local proxy view object linked to a remote proxy object within a second application display structure for a second application executing in a second application space.

9. A non-transitory machine readable storage medium storing instructions which when executed cause a data processing system to perform a method comprising:
creating, by a display manager executing on a processor in a device, a local proxy view object within a display manager structure in a display manager space;
registering, by the display manager, an identifier for a remote proxy object within a first application display structure for a first application executing in a first application space, wherein the first application display structure further comprises a plurality of application view objects representing views for the first application;
assigning, by the display manager, the identifier for the remote proxy object to the local proxy view object to create a composite display structure in the display manager space; and
rendering, by the display manager, the composite display structure to display an image corresponding to the views for the first application.

10. The non-transitory machine readable storage medium of claim 9, wherein the display manager structure further comprises a local window object and a plurality of local view objects logically linked to the local window object in a hierarchy, wherein the local proxy view object comprises one of the plurality of local view objects.

11. The non-transitory machine readable storage medium of claim 9, further comprising:
determining if an identifier has been received from the first application; and
if an identifier has not been received from the first application, assigning a default identifier to the local proxy view object.

12. The non-transitory machine readable storage medium of claim 9, wherein registering an identifier comprises receiving the identifier from the first application.

13. The non-transitory machine readable storage medium of claim 9, wherein the first application display structure further comprises an application window logically linked to the plurality of application view objects wherein the remote proxy object comprises a copy of the application window object.

14. The non-transitory machine readable storage medium of claim 9, wherein assigning the identifier comprises mapping the remote proxy object to the local proxy view object.

15. The non-transitory machine readable storage medium of claim 10, wherein rendering the composite display structure further displays views corresponding to the local view objects.

16. The non-transitory machine readable storage medium of claim 15, wherein the first application display structure further comprises a local proxy view object linked to a remote proxy object within of a second application display structure for a second application executing in a second application space.

17. A system, comprising:
a processor; and
a memory coupled to the processor, the memory storing a display manager and a first application wherein the display manager causes the processor to:
create a local proxy view object within a display manager structure in a display manager space;
register an identifier for a remote proxy object within a first application display structure for the first application executing in a first application space, wherein the first application display structure further comprises a plurality of application view objects representing views for the first application;

assign the identifier for the remote proxy object to the local proxy view object to create a composite display structure in the display manager space; and render the composite display structure to display an image corresponding to the views for the first application.

18. The system of claim 17, wherein the display manager structure comprises a local window object and a plurality of local view objects logically linked to the local window object in a hierarchy, wherein the local proxy view object comprises one of the plurality of local view objects.

19. The system of claim 17, further comprising:
determining if an identifier has been received front the first application; and
if an identifier has not been received from the first application, assigning a default identifier to the local proxy view object.

20. The system of claim 17, wherein registering an identifier comprises receiving the identifier from the first application.

21. The system of claim 17, wherein the first application display structure further comprises an application window logically linked to the plurality of application views in a hierarchy, wherein the remote proxy window object comprises a copy of the application window object.

22. The system of claim 17, wherein assigning the identifier comprises mapping the remote proxy object the first application display structure to the local proxy view object.

23. The system of claim 18, herein rendering the composite display structure further displays views corresponding to the local view objects.

24. The system of claim 7, wherein the first application display structure further comprises a local proxy view object linked to a remote proxy window object within a second application display structure for a second process executing in a second application space.

25. A method, comprising:
creating, by a first application executing on a processor in a device, a remote proxy object within a first application display structure in a first application space, the first application display structure further comprising a plurality of application view objects representing views for the first application;
creating, by the first application, an identifier for the remote proxy object; and
sending, by the first application, the identifier to a display manager executing in a display manager space, wherein the display manager maps the identifier to a local proxy view object within a display manager structure in the display manager space and controls rendering of the display manager structure to display an image corresponding to the views for the first application.

26. The method of claim 25, wherein the first application display structure further comprises an application remote window object logically linked to the plurality of application view objects in a hierarchy, wherein the remote proxy object comprises a copy of the application window object.

27. The method of claim 25, wherein the display manager structure further comprises a local window object and a plurality of local view objects logically linked to the local window object in a hierarchy, wherein the local proxy view object comprises one of the plurality of local view objects.

28. The method of claim 25, wherein the mapping comprises assigning the identifier to the local proxy object.

29. The method of claim 25, further comprising:
receiving, by the first application, an identifier for a remote proxy object within a second application display structure for a second application executing in a second application space; and
assigning, by the first application, the received identifier to a local proxy view object within the first application display structure, wherein the remote proxy view object comprises one of the plurality of application view objects.

30. A non-transitory machine readable storage medium storing instructions which when executed cause a data processing system to perform a method comprising:
creating, by a first application executing on a processor in a device, a remote proxy object within a first application display structure in a first application space, the first application displace structure further comprising plurality of application view objects representing views for the first application;
creating, by the first application an identifier for the remote proxy object; and
sending, by the first application, the identifier a display manager executing in a display manager space, wherein the display manager maps the identifier to a local proxy view object within a display manager structure and controls rendering of the display manager structure to display an image corresponding to the view for the first application.

31. The non-transitory machine readable storage medium of claim 30, wherein the first application display structure further comprises a local window object logical linked to the plurality of application view objects in a hierarchy, wherein the remote proxy object comprises a copy of the application window object.

32. The non-transitory machine readable storage medium of claim 30, wherein the display manager structure further comprises a local window object and a plurality of local view objects logically linked to the local window object in a hierarchy, wherein the local proxy view object comprises one of the plurality of local view objects.

33. The non-transitory machine readable storage medium of claim 30, wherein the mapping comprises assigning the identifier to the local proxy view object.

34. The non-transitory machine readable storage medium of claim 30, wherein the method further comprises:
receiving, by the first application, an identifier for a remote proxy window object within a second application display structure for a second application executing in a second application space; and
assigning, by the first application, the received identifier to a local prosy view object within the first application display structure, wherein the remote proxy view object comprises one of the plurality of application view objects.

35. A system, comprising:
a processor; and
a memory coupled to the processor, the memory storing a first application and a display manager, wherein the first applications process causes the processor to:
create a remote proxy object within a first application display structure in a first application space, wherein the first application display structure further comprising a plurality of application view objects representing views for the first application;
create an identifier for the remote proxy object; and
send the identifier to the display manager executing in a display manager space, wherein the display manager maps the identifier to a local proxy view object within a display manager in the display manager space and controls rendering of the display manager structure to display an image corresponding to the vie for the first application.

36. The system of claim 35, wherein the first application display structure further comprises a local window object logically lined to the plurality of application view objects, wherein the remote proxy object comprises a copy of the application window object.

37. The system of claim 35, wherein the display manager structure comprises a local window object and a plurality of local view objects logically linked to the local window object in a hierarchy, wherein the local proxy view object comprises one of the plurality of local view objects.

38. The system of claim 35, wherein the mapping comprises assigning identifier to the local proxy view object.

39. The system of claim 35, wherein the first process is further configured to:
    receive an identifier for a remote proxy window within a second application display structure for a second application executing in a second application space; and
    assign the received identifier to an application proxy view object within the first application display structure, wherein the remote proxy view object comprises one of the plurality of application view objects.

* * * * *